April 8, 1952   A. M. ACKROYD   2,592,371
VALVE FOR COMPRESSED ACETYLENE

Filed Nov. 14, 1946   2 SHEETS—SHEET 1

Archie M. Ackroyd   Inventor
By _____ Attorney

Patented Apr. 8, 1952

2,592,371

UNITED STATES PATENT OFFICE 2,592,371

VALVE FOR COMPRESSED ACETYLENE

Archie M. Ackroyd, New Hope, Pa., assignor to Standard Oil Development Company, a corporation of Delaware Application November 14, 1946, Serial No. 709,673

2 Claims. (Cl. 251—104)

The present invention relates to a valve for controlling the flow of concentrated fluids that are subject to violent decomposition or explosion under pressure.

Various gases are unstable and tend toward violent spontaneous decomposition under certain conditions due to exothermic reactions. For example, acetylene at pressures in excess of two atmospheres and temperatures in excess of 780° C. is very unstable and subject to explosion. Liquefied acetylene is especially dangerous and its use is generally prohibited. Utilization of acetylene and gases with similar properties is, therefore, seriously limited.

For commerce, acetylene is not compressed in storage tanks or cylinders but is dissolved in acetone. Approved containers are filled with asbestos disks saturated with acetone. The asbestos disks have a porosity of between 75–80%. Approximately 40% of the pore space available is filled with acetone which will dissolve about twenty-five times its volume of acetylene.

Recent developments in acetylene technology have necessitated new acetylene handling equipment. Piping, exposing a large surface of piping or other material per unit volume of pipe, greatly lessens the danger of explosion. However, considerable difficulty has continued to be experienced in the means for regulating the flow of pressure-sensitive gases. When valves of standard construction are used, localized decomposition has caused coking or burning out of the line. Usually such reactions occur within six to eight inches of a valve of standard construction.

The principal object of the present invention is to provide a valve for the safe and efficient control of concentrated pressure-sensitive gases under pressure.

An important feature of this invention is providing means for exposing a relatively large surface area of solid contact material to the gas passing through. The relatively large area of contact surface will eliminate the possibility of acetylene decomposition reaction being started within the valve. This end may be accomplished by requiring the gas to be controlled to pass through the valve in a plurality of fine streams. By providing channels in upstream and downstream ports and in the flow-controlling movable member which acts as the valve throat, the gas stream is divided into fine streams. The channels may be partitioned by a plurality of tubes through the valve throat which coact, when the valve is in an open position, with inlet and discharge ports of the valve casing similarly provided with such channels. The channels may also be partitioned by a plurality of vanes in the valve throat and the upstream and downstream ports. Said vanes may be rectangular, hexagonal, or of irregular shape. The large surface area may also be provided by drilling a plurality of small diameter holes through a solid movable plug or slide and through solid inlet and outlet ports of the valve body. This type of structure is of particular interest in the case of slide valves. It is possible to use still other partitioning structures for providing a relatively large area of contact surface. For example, closely-spaced screens or gas-permeable solid packing arrangements may be provided throughout the valve passage at right angles to the axis of flow, but preferably such channelizing structures should cellularize or compartmentalize the streams of gas without causing undue flow restriction. The thus-partitioned channels may have a cross-section width of 0.05 to 0.2 inch.

The applicant's valve is to be distinguished from valves that restrict the flow of a fluid therethrough by obstructions or constrictions at one point or another which would create a relatively large pressure drop. In the valve of the present invention, there is no unnecessary restriction to the gas flowing through and no space is allowed for accumulation of gas. The valve, therefore, provides a large area of contact surface with unrestricted flow when the valve is fully open and permits uniform and constant flow from inlet to outlet.

Figure 1:
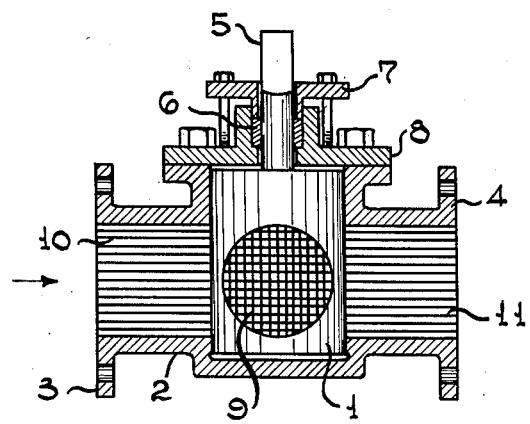
Figure 1 shows in elevation a rotary plug valve in the closed position wherein fluid passages are partitioned by closely-spaced thin vanes, a vertical cross-section of the valve casing being shown.

In Figure 1, a movable plug with an external conical surface similar to a cock plug is represented by 1, a valve casing 2 is provided with flanges 3 and 4. The plug 1 is provided with a cylindrical stem 5 projecting through packing 6 and packing gland 7 in cover 8 of valve casing 2. Plug 1 in Figure 1 is provided with many small channels partitioned by a plurality of closely-spaced thin vanes 9. The vanes 9 in the valve plug cooperate with similarly aligned vanes 10 and 11 through the inlet and outlet ports of valve casing 2.

Figure 2:
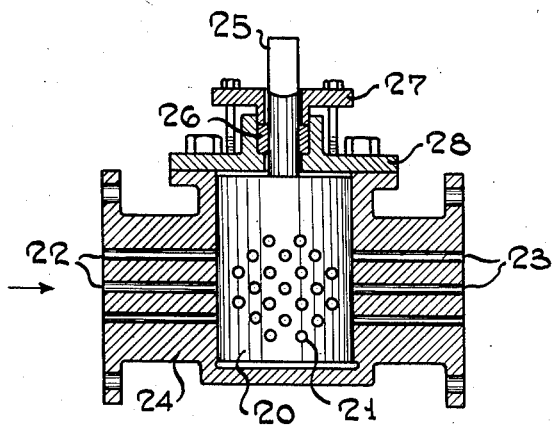
Figure 2 shows in elevation a rotary plug valve in the closed position with fluid passages being formed by a plurality of perforations through said plug body and through parts of the body shown in vertical cross-section.

In Figure 2, the valve plug 20 is provided with a plurality of drilled perforations 21 or tubular channels. Cooperating with the perforations 21 is a plurality of perforations 22 and 23 running axially through inlet and discharge ports, respectively, in valve body 24. To plug 20 is attached a cylindrical stem 25 projecting through a packing 26 and gland 27 in the cover 28 of body 24.

Figure 3:
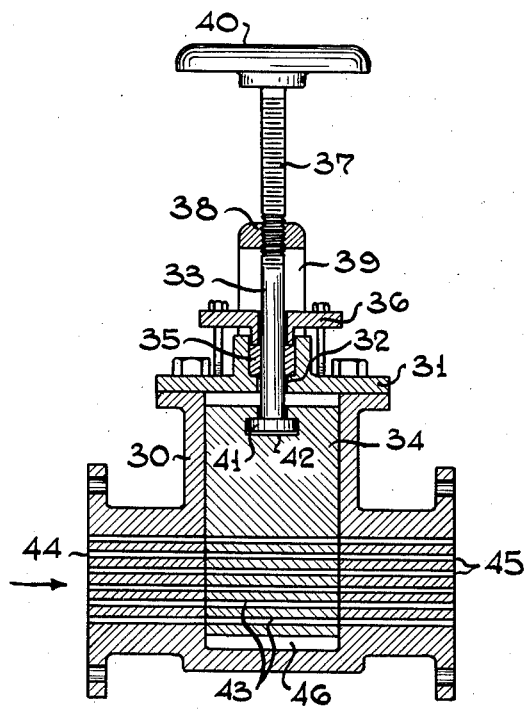
Figure 3 illustrates in elevation another type of valve design employing the applicant's invention with a reciprocatory control member and drilled perforations as fluid passages in said member and in ports of the valve body shown in the vertical cross section.

Figure 3 represents a variation of the slide valve type. Valve casing 30 is fitted with a cover 31 in which an opening 32 is provided through which stem 33 of the slide 34 is passed. The stem 33 passes through packing 35 and gland 36 and has threads 37 engaging threads 38 in the yoke 39. Reciprocatory motion is imparted to the slide 34 by revolving a wheel 40 attached to the upper end of stem 33, the lower disk end 41 of stem 33 being free to rotate in a retaining socket 42 in the upper part of slide 34. The slide 34 is solid except for fluid passage perforations 43 which are in alignment with similar perforations 44 and 45 in the inlet and outlet ports of the valve casing, respectively. By only slight vertical movement of the slide 34 on turning wheel 40, the channels 43 are displaced from alignment with the channels 44 and 45, and the valve is then in a shut-off position. A small part of slide 34 is moved into a shallow well 46 when the valve is shifted to a shut-off position, and channels 43 in the slide 34 are shifted to positions intermediate the openings to channels 44 and 45 in the valve ports. Thus, there is only a small clearance between the upper or lower ends of the slide member and the valve casing interior surfaces when the valve is in open or shut-off positions. The depth of the well 46 for receiving the slide 34 need not be greater than the distance between consecutive rows of tubular channels in the direction of the sliding movement for the slide member.

A variety of valve designs may be constructed in accordance with the applicant's invention for the safe and efficient handling of concentrated pressure-sensitive fluids under pressure. In general, the flow-controlling movable member, such as a rotary plug or slide is provided with a plurality of narrow passages which constitute extensions of similar passages in the inlet and discharge ports of an enclosing valve casing. When activated by an outside force on its stem, the movable member may be turned or slid into a position whereby the passages through the slide or plug, acting as a movable member, are moved or turned away from the inlet and discharge port passages and the latter are sealed by solid portions of the slide or plug. The fluid passages or channels in the movable member are preferably of the same number and size as those in each port, and preferably all the channels or fluid passages are uniform in size, no other space being present with the valve casing for fluid flow.

I claim:

1. A valve structure for controlling flow of a concentrated pressure-sensitive gas under pressure, comprising a valve body, coaxial opposed inlet and outlet ports in said body, a valve member between said ports having a corresponding port laterally therethrough, said member being movable in the valve body to register its port with those in said body, and separate partition elements positioned in each of said ports, each of said partition elements comprising a plurality of thin plates arranged laterally and longitudinally of each of the ports in intersecting manner to form a plurality of co-extensive, individual, walled passageways therethrough, and alignable through said valve body by movement of the valve member, whereby an enlarged contact surface is provided in each of said ports without substantial reduction in the cross-sectional port area.

2. The valve structure defined by claim 1 in which said valve member is a rotatable plug.

ARCHIE M. ACKROYD.

REFERENCES CITED

The following references are of record in the file of this patent:

UNITED STATES PATENTS

| Number | Name | Date |
|---|---|---|
| 251,019 | Babcock | Dec. 20, 1881 |
| 944,026 | Fowden | Dec. 21, 1909 |
| 1,103,931 | Bennett | July 21, 1914 |
| 2,143,565 | Minea | Jan. 10, 1939 |
| 2,227,661 | Martinson | Jan. 7, 1941 |
| 2,301,428 | MacNeil | Nov. 10, 1942 |

FOREIGN PATENTS

| Number | Country | Date |
|---|---|---|
| 2,301 | Great Britain | of 1858 |
| 277,100 | Great Britain | of 1927 |